Nov. 19, 1935.　　　　F. P. MILLER　　　　2,021,668
ROTARY CUTTER
Filed June 1, 1932　　　　2 Sheets-Sheet 1
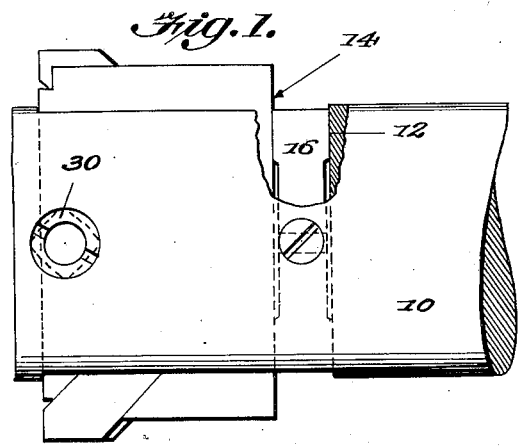
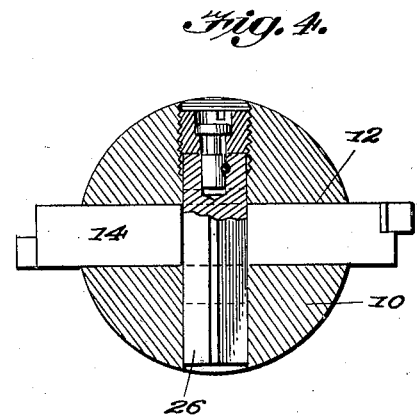
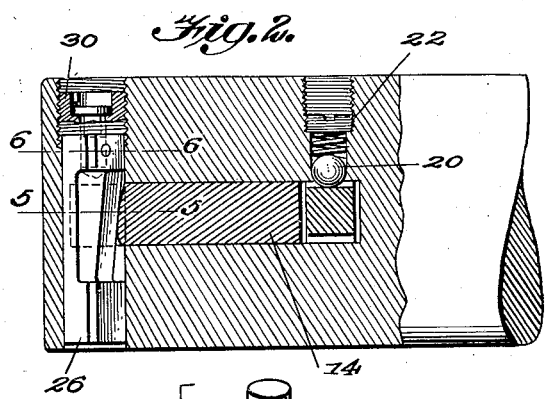
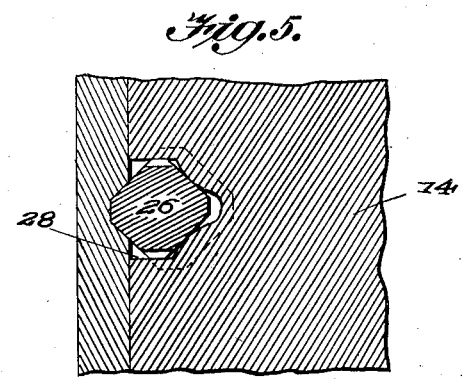
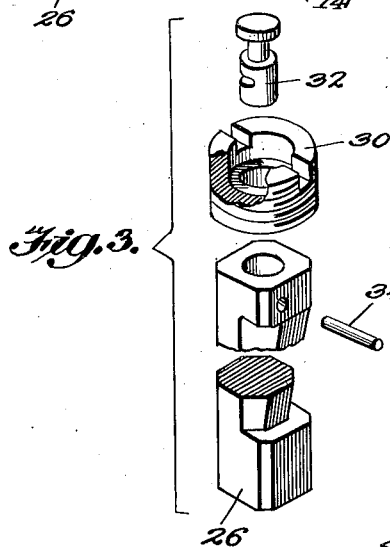
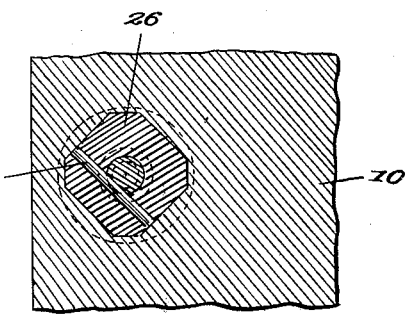
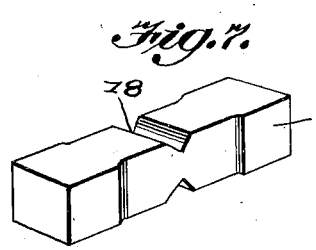
Inventor
FRANK P. MILLER Nov. 19, 1935.  F. P. MILLER  2,021,668
ROTARY CUTTER
Filed June 1, 1932   2 Sheets-Sheet 2
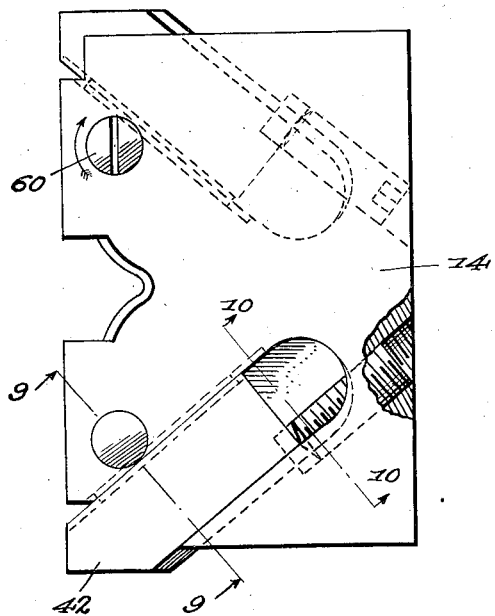
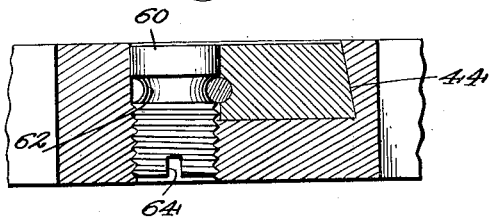
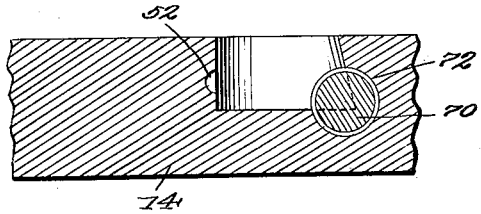
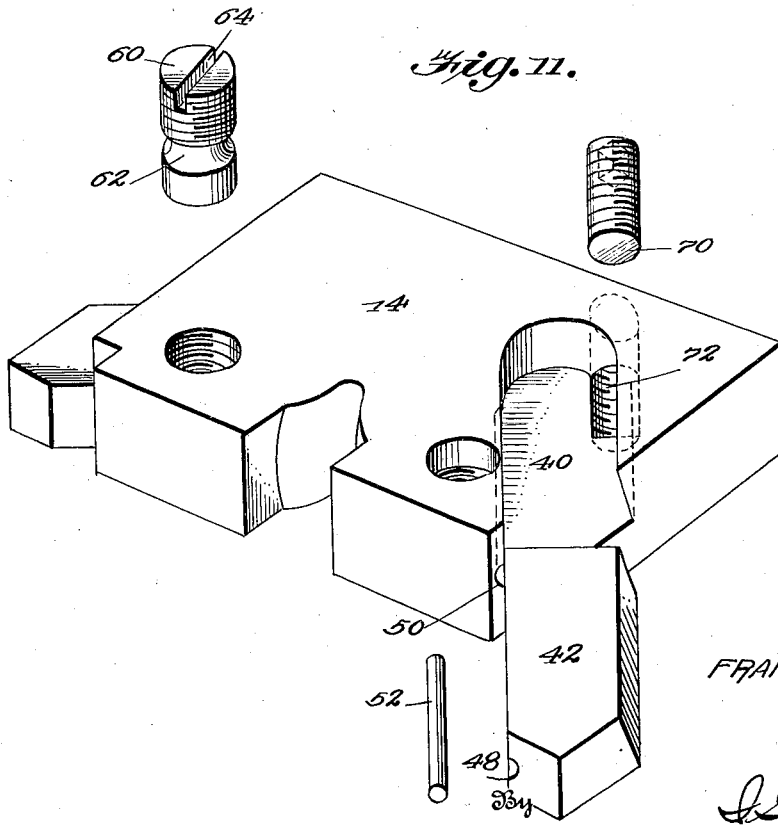
Inventor
FRANK P. MILLER Patented Nov. 19, 1935

2,021,668

UNITED STATES PATENT OFFICE 2,021,668

ROTARY CUTTER

Frank P. Miller, Meadville, Pa.

Application June 1, 1932, Serial No. 614,823

13 Claims. (Cl. 77—56)

This invention relates to rotary cutters of the boring bar type.

The invention forming the subject of this application will be found to embody simple means by which the cutting unit of a rotary cutter such for example, as a boring bar, may be rigidly mounted or allowed to float within adjustable limits to follow the hole being worked and the invention will further be found to provide simple means by which correction may be made for misalignment of the bar, as a result of warpage, distortion or inaccuracies in workmanship.

Another feature of the invention resides in the fact that the cutting unit may be removed without disturbing the adjustment of the blades thereof or retracting the locating pin by which the cutting unit is held in place, the arrangement of this phase of the invention being such that the cutting blades may be caused to extend beyond the plane of the front wall of the slot within which the cutting block is mounted.

The locating pin by which the cutting unit is held in place will be found to have an adjusting element swivelled thereto to provide for the advancement and retraction of the locating pin for purposes of adjustment and since the adjusting element is swivelled to the locating pin, such pin may be substantially rectangular in cross section and fitted into a similarly shaped hole in the bar or other support, with the result that the pin is held against turning and is therefore held in proper position with respect to the associated cutting unit.

Another feature of the invention resides in the cutter block in which each blade carried thereby is dove-tailed on only one longitudinal side thereof to the cutter block while the other side of each blade extends approximately at right angles to the plane of the block and is securely engaged by a novel locking arrangement by which the blade is held in place, which arrangement allows increased cross sectional area and consequently greater strength on the part of the blade, while at the same time providing for an addition to the cutting surface of the blade.

Another aspect of the invention has special reference to the blade fastening means in which the manner of mounting the set screw of such blade fastening means is such that the advancement of the set screw not only brings about lateral movement of the associated locking pin into engagement with the adjacent blade but at the same time urges the locking pin rearward so that the pin, in turn, urges the adjacent blade rearward to firmly seated position and thus acts in concert with the thrust of the cut as distinguished from other cutters in which the advancement of the corresponding set screw urges the associated locking pin outward and consequently tends to disturb the adjustment of the blade.

Another object of the invention is to provide a cutter of the character described which is characterized by extreme simplicity, efficiency in operation, and economy of manufacture.

Other objects and advantages will be apparent during the course of the following description.

In the accompanying drawings forming a part of this application and in which like numerals are employed to designate like parts throughout the same, Figure 1 is a fragmentary side elevation of a cutter embodying the invention, parts being broken away.

Figure 2 is a similar view taken at an angle of about 90° to the showing of Figure 1, Figure 3 is a fragmentary group perspective of a locking pin embodied in the invention, Figure 4 is a detail transverse sectional view through the cutter, the view illustrating the mounting of the locating pin, Figure 5 is a detail transverse sectional view taken on line 5—5 of Figure 2, Figure 6 is a detail sectional view taken on line 6—6 of Figure 2, Figure 7 is a perspective of a thrust member embodied in the invention, Figure 8 is a side elevation of a cutter block forming a part of the invention, Figure 9 is a detail sectional view taken on lines 9—9 of Figure 8, Figure 10 is a detail sectional view taken on line 10—10 of Figure 8, Figure 11 is a group perspective of the cutter block embodied in the invention, In the drawings, the numeral 10 designates a boring bar or other support which, as is obvious to those acquainted with the art, is provided with means such, for example, as a tapered attaching portion for connection with a driving mechanism of whatever nature the latter happens to be.

The support 10 is shown to be provided with a diametrical slot 12 opening out through opposite sides thereof and receiving a cutting unit in the form of a cutter block 14. A thrust receiving and transmitting member 16 is positioned closely between the rear wall of the block 14 and the rear wall of the slot 12, and as shown in Figure 7, is provided between the ends thereof with transverse V-shaped grooves 18 either of which may receive a spring pressed ball 20 so as to releasably hold the thrust member against movement. Figure 2 clearly illustrates that a set screw 22 is threaded into the bar to hold the ball 20 and the associated spring releasably in place. Clearly, it is a simple matter to remove the thrust member from either side of the bar by simply exerting sufficient endwise pressure on the same to overcome the spring pressure on the ball 20.

When the thrust member 16 is in its intended position as shown in Figures 1 and 2, it holds the cutter block in its foremost position in engagement with the locating pin 26. More specifically the cutter block is provided with a notch or recess 28, opening out through the forward edge thereof for the reception of the intermediate portion of the locating pin 26 and it is believed to be clear that the removal of the thrust member 16 will allow the cutter block to be moved back and then radially out from the slot without first removing the pin 26 or disturbing the adjustment of the blades carried by the cutter block, which two important features look to the expeditious removal and return of the cutter block for anyone of a number of purposes or the substitution of the cutter block by one of another size or working characteristic. With special reference to Figures 2 and 5, it will be seen that the pin contacting walls of the notch 28 are convex or are bulged or crowned to define rounded surfaces thus reducing the area of contact between the locating pin and the block and maintaining the points of contact substantially centrally of the notch 28 regardless of slight inaccuracies in the relative positions of the various angular surfaces.

This arrangement of convex walls for presentation to the locating pin provides for firm and uniform pressure contact of the locating pin with the wall of the notches notwithstanding inaccuracies or irregularities in workmanship.

In other words, the notch 28 has synclastic surfaces for engagement at points inward of the edges thereof by the opposed flat surfaces of the locating and clamping pin 26.

I believe that I am the first to provide a tool of the type shown in which the cutter block is formed with synclastic surfaces for engagement at points inward of the borders thereof by the opposed complemental surfaces of a locating and holding member such, for example, as is represented by the element 26.

It will be seen that the outer portions of the walls of the notch 28 are parallel while the inner portions of such walls converge in the form of a V and it is the converging portions of these walls that are convex for pressure contact with the locating pin.

As shown in Figure 5, the locating pin 26 is approximately rectangular in cross-section and is positioned so that the axis or center line of the bar bisects the diagonally opposite corners of the pin thereby disposing two flat surfaces of the pin in opposed relation to the convex surfaces of the notch 28. Such contact surfaces of the locating pin 26 are ground at an acute angle to the plane of the block 14 so that limited retraction of the pin will allow the block to float while advancement of the pin into firm engagement with the convex surfaces of the notch 28 will rigidly hold the block in place. The hole for the reception of the pin 26 is square and has the dimensions necessary for the snug reception of the pin so that the pin is held against turning.

It is important to observe that the locating pin engages the convex walls of the notch inward of the edges or corners of such walls, this being in contrast to the engagement of sharp corners with the pin and in consequent cutting or grooving of the pin and the definite impairment of the functions of the pin.

Now, should the bar be found to be out of alignment as a result of warpage or inaccuracies in workmanship or from any other cause, correction for this is made possible by selectively and individually grinding away one of the block contacting faces of locating pin 26 a sufficient amount to cause the block to occupy a central position with respect to the hole being worked.

It will be seen that one of the advances marked by the invention has to do with the use of a locating pin having flat faces for engagement with the opposed convex walls of the notch in the boring block, this being in contrast to the use of a round pin having engagement with the flat walls of a notch.

One main objective is to devise a means whereby the oppositely located cutting blades in the block can be machined exactly true to the longitudinal axis of the boring bar. It is exceedingly difficult, if not impossible, to machine the bar and the locating pin and the hole to receive the locating pin with sufficient accuracy to produce this result. Furthermore, it is frequently true that the bar is sprung out of line in service and this, of course, means that the cutting blades of the block will not be true with the cutting center line of the bar. It therefore becomes necessary to bring the two cutting blades back to their original cuttings positions with reference to a straight line extending longitudinally through the center about which the cut is being made.

This trueing-up or correcting operation must be done in the bar itself which, of course, carries the locating member or pin as a more or less permanent part thereof. If the locating member can be kept true to the bar, it will then be possible to interchange cutting members on the same job or over a period of years and have them true with the bar. If an attempt is made to correct the inaccuracy by changing the cutter blocks themselves, or by grinding the cutter blocks, it means that all cutting blocks used in succession on the same job or used over a period of time in the same bar, must be similarly corrected. This would be a very expensive and impracticable means of making this correction. A round pin never sets at exactly the same point of rotation. Therefore, it is not possible to grind off one side of a round pin and have a reliable locating device.

The herein disclosed locating means provides for accurate location of the cutter block to compensate for inequalities by the use of a locating pin which is not round and which thus, may be held in a definite position with flat surfaces, coming into contact with the opposed walls of a V-shaped groove in one edge of the block. By grinding one surface or the other, the correction can easily be made and becomes reasonably permanent with no correction necessary in the cutter block then in use or in other blocks which might later be used.

As shown in Figures 2, 3 and 4, an adjusting element 30 in the form of an externally threaded sleeve nut is mounted on and is swivelled to the rear portion of the locating pin 26 through a swivel pin 32. The swivel pin is anchored in a socket in the rear portion of the pin 26 through the aid of a locking pin 34. It is shown in Figures 3 and 4 that the swivel element 32 is diametrically reduced at a point spaced from the upper end thereof to define a neck and a head upon the neck, and such neck is surrounded by the inwardly flanged lower portion of the sleeve nut 30 to the end that the members 26 and 30 are swivelly connected. The member 30 is shown to be threaded into the rounded rear portion of the hole within which the pin 26 is located and thus, turning of the element 30 with the aid of a screw driver or other suitable means moves the locating member 26 endwise, the direction of movement depending upon the direction in which the member 30 is turned.

At all positions of the locating pin, the same is backed for the full length thereof by the adjacent portion of the bar 10.

As shown in Figure 11, the cutter block 14 is formed in opposite sides thereof with angularly extending slots 40 receiving blades 42. It is illustrated in Figures 9 and 11 that one longitudinal side of each blade has a dove-tailed contact 44 with the block while the other longitudinal side or edge of the blade is lacking in such dove-tail fit and, in fact, extends approximately at right angles to the plane of the blade and the block, giving to the blade a greater cross-sectional area and providing a longer facing or cutting edge than is the case where the blade is dove-tailed on both sides. That side of the blade 42 which extends at right angles to the plane or surface of the block 14 is provided with a longitudinal groove 48 mating with a more or less similar groove 50 in the opposed side of the slot 40 for the reception of a cylindrical locking pin 52.

Referring now to Figure 9, it will be seen that a locking screw 60 is threaded through the block at a point contiguous to the associated blade and is provided between the ends thereof with an annular groove 62 defining a transversely curved annular shoulder for pressure contact with the adjacent locking pin 52, so that advancement of the screw 60 will bring about the transverse movement of the locking pin into binding engagement with the associated blade. Now, it is clearly illustrated in Figure 9 that the forward portion of the set screw 60 is provided with left hand screw threads which are, of course, the reverse of the threads ordinarily found on the corresponding parts in inserted blade cutting tools and this arrangement requires that advancement of the set screw be brought about by the left hand turning of the set screw. Such left hand turning of the set screw not only moves the locking pin 62 laterally, but rearwardly thereby exerting a rearward force on the associated blade 42. The rearward force thus applied to the blade 42 tends to hold the blade in a firmly seated and adjusted position and thus acts in concert with the thrust of the cut as distinguished from the outward or unseating force that would be exerted by a right-hand screw.

In summarizing the construction shown in Figures 8, 9, 10 and 11, it will be seen that the same embodies, broadly, a cutter block in which the body thereof has a slot provided with an inner end and front and back sides and that a blade is adjustably positioned in the slot and has leading and trailing sides and, further, that the locking pin 52 engages the leading side of the blade under the force of a binding screw located adjacent the front side of the slot and engaging the pin at a point between the ends of the slot, the body and the screw having interfitting left-hand threads necessitating counter-clockwise rotation of the screw to advance the screw and turn the pin side of the screw in the direction of the said inner end of the slot and thus urge the locking pin and the blade toward the said inner end of the slot while, at the same time, forcing the trailing side of the blade firmly against the back side of the slot. By this arrangement, the trailing side of the blade is allowed to have thrust transmitting contact with the back side of the slot while at the same time the screw 60, which is located at the leading side of the blade, may be turned in a counter-clockwise direction to advance the screw and thus force the pin 52 laterally and rearwardly, thereby urging the blade rearward or in the same direction in which the same is urged under the influence of the cutting thrust. Clearly, it is not feasible to locate the binding screw adjacent the trailing side of the blade because it is required that there be a firm thrust transmitting contact between the back side of the blade and the back side of the slot.

Further, the groove 50 is shown to be tapered or decreased in depth toward the rear portion thereof and to have a beveled rear wall so that when the rear end of the pin engages the beveled rear wall of the groove 50 it will be forced laterally into effective binding engagement with the blade to the end that the blade is not only held firmly in place but is urged constantly to its seated or adjusted position.

The forward portion of the set screw 60 is shown to be provided with a tool engaging means in the form of a screw driver slot 64 so that, even though the set screw 60 is provided with a left hand thread, advancement of the same is accomplished by turning the screw driver to the right as is customary.

As shown in Figures 10 and 11 each blade 42 is engaged at the rear end thereof by a thrust screw 70 and such thrust screw is threaded into an opening 72 in the block. It is important to observe that the socket 72 opens for substantially less than 180° into the slot 40 so that the thrust screw is prevented from moving laterally from the socket 72 into the slot 40.

Attention is invited to Figure 10, in which it is illustrated that the opening 72 breaks through that longitudinal corner of the slot 40 in which the walls of such corner are at an acute angle to each other so that while less than a quarter of the circumference of the screw is exposed and left without bracing substantially more than a quarter of the cross-sectional area of the screw, including the axial center of the screw is in the slot for pressure engagement at the forward end thereof with the blade 42. In other words, a generous area of contact is provided between the screw 70 and the blade 42 without a corresponding reduction in a generous area of contact between the screw and the block.

Also, by causing the opening 72 to break through adjoining walls of the slot as distinguished from breaking solely through one wall, weakening of the block, by reason of the presence of the slot is avoided.

It will be apparent to anyone familiar with the art that the improved method of locking blades in cutting position may be used in rigid types of boring bars in which the cutting blades are mounted directly in the bar instead of being mounted in a floating or separate block type unit, as shown herein.

Having thus described the invention, what is claimed is:

1. In a cutting tool, a support having a slot, a cutter block in the slot, and a locating pin carried by the support and intersecting the block, said locating pin and said block being formed with opposed contact faces at an acute angle to the axis of the support and limiting transverse movement of the block, the contact faces of said pin being individually and selectively grindable to alter the position of the block with respect to said support, and an adjusting member carried by said support and swivelled to said locating pin, there being means holding said locating pin against rotation.

2. In a cutting tool, a support having a transverse slot and a rectangular hole intersecting the slot, a block in the slot, a locating pin substantially rectangular in cross section and snugly received in said hole, and an adjusting element swivelled to one end of said locating pin and having means whereby the same may be turned, said block being provided with a void receiving a portion of said locating pin and having convex walls for uniform pressure contact with the opposed walls of said rectangular pin.

3. In a cutting tool, a support having a transverse slot and a rectangular hole intersecting the slot, a block in the slot, a locating pin substantially rectangular in cross section and snugly received in said hole, an adjusting element swivelled to one end of said locating pin and having means whereby the same may be turned, said block being provided with a void receiving a portion of said locating pin and having convex walls engaging said pin, a thrust member between said block and one wall of said slot, and a fastening device to releasably hold said thrust member in position.

4. In a cutter of the class described, a body having a slot, a cutter block in the slot and having a notch, a locating pin traversing the body in intersecting relation to the longitudinal axis thereof and extending through said notch, said notch being formed with converging walls, each of said walls being curved inward in two directions toward the pin for engagement by the pin at points spaced inward of the boundaries of the converging walls.

5. In a cutter of the type employing an inserted cutter block, a body having a slot, a cutter block in the slot and having a notch provided with convex walls, a locating and clamping pin carried by said body and having flat faces engaging the convex walls only at points between the edges thereof and being free from contact elsewhere with said convex walls.

6. In a cutter of the type employing an inserted cutter block, a body having a slot, a cutter block in the slot and having a notch provided with convex walls defining crowns, and a locating pin carried by said body and having flat faces engaging said crowns and being in constantly spaced relation to the edges of said convex walls, said faces of the locating pin being at acute angles to the longitudinal axis of the body.

7. In a cutting tool of the type employing an inserted cutter block, a support having a transverse slot, a cutter block in the slot and having a recess provided with convex walls having centrally crowned portions, a locating pin carried by said support and having flat contact surfaces engaging the convex walls in proximity to the crowned portions thereof and in constantly spaced relation to the edges of the convex walls, the said flat faces of the locating pin being individually and selectively grindable to alter the position of the cutter block with respect to said support.

8. In a boring bar, a body having a transverse slot, a cutter block in the slot and having a notch provided with side walls curved inward in two directions, thereby defining raised central portions, a locating and clamping pin passing through the notch having an intermediate portion provided with flat sides engaging the raised central portions and being constantly spaced from the margins of said walls.

9. In a cutter of the type employing an inserted cutter block, a body having a slot, a cutter block in the slot and having a notch, a locating pin traversing the body and extending through said notch, said notch being formed with walls curved inward toward the central portions thereof and toward the pin for engagement at the central portions thereof with the pin and being constantly spaced at the edge portions thereof from the pin.

10. In a cutting tool of the type employing a cutter block, a body having a transverse slot, a cutter block in the slot and having a substantially V-shaped notch in one edge portion thereof, a locating and holding pin having the intermediate portion thereof extended through said notch and provided with two converging sides engaging the opposed walls of said notch only at points between the edges thereof and being constantly spaced from the edges of said walls.

11. In a boring bar of the type employing an inserted block having cutting means, a body having a slot extending therethrough, a cutter block in said slot and having a substantially V-shaped notch in one edge portion thereof, a locating pin passing through the notch and having flat converging sides engaging the opposed walls of the notch only at points substantially inward of the edges thereof and being in constantly spaced relation to said edges, there being means holding the pin and the flat sides thereof against accidental turning.

12. In a cutter of the type embodying an inserted cutter block, a body having a slot, a cutter in the slot and having spaced synclastic surfaces, and a locating pin carried by the body and having a tapered portion provided with flat surfaces extending between and engaging said synclastic surfaces at points spaced inward of the edges thereof to position the block in the slot.

13. In a cutter of the type embodying an inserted cutter block, a body having a slot, a cutter in the slot and having spaced synclastic surfaces, a locating pin carried by the body and having a tapered portion provided with flat surfaces extending between and engaging said synclastic surfaces at points spaced inward of the edges thereof to position the block in the slot, and means to adjust the locating pin longitudinally thereof and transversely of the body, the flat surfaces of said pin being individually and selectively grindable to alter the position of the block with respect to the body.

FRANK P. MILLER.